Patented Nov. 1, 1927.

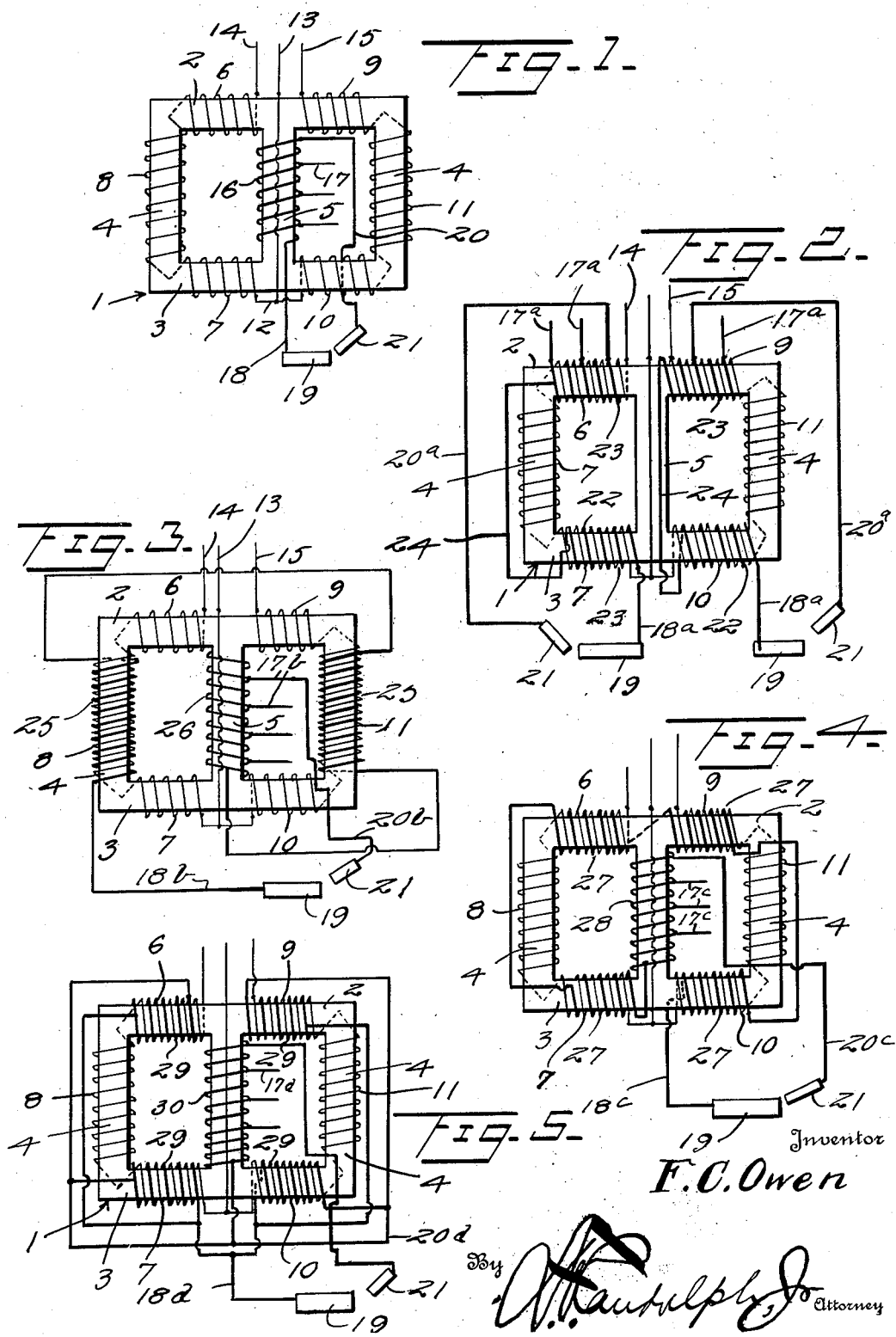

1,647,928

UNITED STATES PATENT OFFICE.

FREDERICK C. OWEN, OF FAYETTEVILLE, NORTH CAROLINA.

TRANSFORMER FOR ELECTRIC-ARC CUTTING AND WELDING APPARATUS.

Application filed November 14, 1925. Serial No. 69,065.

This invention relates to alternating current electric arc cutting and welding apparatus and more particularly to polyphase and single phase transformers for such apparatus.

The invention has for one of its objects to improve and simplify the general construction of transformers of the character stated and to provide transformers that shall be so wound and constructed as to obviate the necessity of the use of fans or other mechanical cooling means and the use of flux diverters, damping devices or manually operated resistances and reactances for regulating the current and potential in the primary and secondary windings.

With the foregoing and other objects in view, the invention consists of the novel construction, combination and arrangement of parts hereinafter fully described and claimed, and illustrated in the accompanying drawing, wherein:

Figure 1 is a diagrammatic view of an alternating current electric arc cutting and welding apparatus embodying a transformer constructed in accordance with my invention, Figure 2 is a similar view illustrating a slightly modified form of the transformer, and Figures 3, 4 and 5 are similar views illustrating further modified forms of the transformer.

Corresponding and like parts are referred to in the following description, and designated in all the figures of the drawing, by similar reference characters.

Referring in detail to the drawing, and more particularly to Figure 1, 1 designates the closed circuit core which is of laminated construction and embodies a top leg 2, bottom leg 3, side legs 4, and middle leg 5.

The primary winding of the transformer comprises a section consisting of coils 6, 7 and 8 connected in series and mounted on the legs 2, 3 and 4 at one side of the leg 5, and a section consisting of coils 9, 10 and 11 connected in series and mounted on the legs 2, 3 and 4 at the opposite side of the leg 5. The coils 7 and 10 are connected by a wire 12. A lead 13 extending from the wire 12, and leads 14 and 15 extending from the coils 6 and 9, permit the transformer to be connected to a three wire single phase circuit or open delta on a polyphase power circuit.

The secondary winding of the transformer comprises a single coil 16 mounted on the leg 5 and provided with taps 17. One end of the coil 16 is connected by a lead 18 to the work 19 which is to be cut, welded or repaired, and any of the taps 17 may be connected by a lead 20 to the cutting, welding or repairing electrode 21.

In Figure 2 is shown a slightly modified form of the transformer. This transformer is adapted to permit two cutting, welding or repair operations to be performed at the same time. The core and primary winding of this transformer are similar to the corresponding parts of the transformer shown in Figure 1. It has two secondary windings mounted on the legs 2 and 3 at opposite sides of the leg 5 and each embodies a main or voltage regulating coil 22 mounted on the leg 3 and an auxiliary or current regulating coil 23 mounted on the leg 2 and connected in series by a wire 24. The coils 22 are connected by leads 18$^a$ to the work 19, and each of the coils 23 is provided with taps 17$^a$ any one of which may be connected by a lead 20$^a$ to the electrode 21. If desired the secondary windings of this transformer may be connected in parallel or series to adapt the apparatus for performing a single cutting, welding or repair operation.

The core and primary winding of the transformer shown in Figure 3 are similar to the corresponding parts of the transformer shown in Figures 1 and 2. The secondary winding is, however, different and comprises main or voltage regulating coils 25 mounted on the legs 4 and an auxiliary or current regulating coil 26 mounted on the leg 5. The coils 25 are to be connected in series when the transformer is to be connected to a polyphase power circuit. The coil 26 is provided with taps 17$^b$ any one of which may be connected by a lead 20$^b$ to the electrode 21, and a lead 18$^b$ extends from this coil to the work 19.

The core and primary winding of the transformer shown in Figure 4 are similar to the corresponding parts of the transformer shown in Figures 1–3. Its secondary winding differs, however, from the corresponding part of either of the other transformers, and embodies main or voltage regulating coils 27 mounted on the legs 2 and 3 at opposite sides of the leg 5, and an auxiliary or current regulating coil 28 mounted on the leg 5. The coils are connected in series, and the coil 28 is provided with taps 17ᶜ any one of which is adapted to be connected by a lead 20ᶜ to the electrode 21. A lead 18ᶜ extends from the coil 28 to the work 19.

In Figure 5 is shown a still further modified form of the transformer. In this transformer the core and primary winding are similar to the corresponding parts of the other transformers. The secondary winding is however, different and embodies main or current regulating coils 29 mounted on the legs 2 and 3 at opposite sides of the leg 5 and an auxiliary or current regulating coil 30 mounted on the leg 5. The main or voltage regulating coils 29 are connected in parallel, and these coils and the auxiliary or current regulating coil 30 are connected in series. The coil 30 is provided with taps 17ᵈ any one of which may be connected to the electrode 21 by a lead 20ᵈ. A lead 18ᵈ extends from the coils 29 to the work 19.

In each transformer, the core provides a plurality of completely closed magnetic paths, the primary winding has a section distributed about the greater portion of each of said paths, and the secondary winding is distributed about both of said paths, with the result that current flowing through the primary winding will induce a constant main voltage and a variable secondary voltage in the secondary winding. The reaction between these voltages is such that a light current is produced at light load and a heavy current at heavy load, with the result that a stable arc of high power factor may be readily maintained during overhead, vertical and horizontal cutting, welding or repairing of steel, wrought iron, cast iron, malleable iron, aluminum, brass, bronze, copper and alloy metals. Furthermore, the arc is free from sputtering or spitting, and it has been found that a skilled operator can maintain an arc within one and one-half per cent plus or minus of the rated capacity of the tap with which the electrode is connected.

What is claimed is:—

1. A transformer comprising a core providing a plurality of closed flux paths, a primary winding embodying sections each distributed about the greater portion of each flux path, and a secondary winding distributed about both of said flux paths.

2. A transformer comprising a core providing a plurality of flux paths, and primary and secondary windings of which the former embodies sections each distributed about the greater portion of each flux path.

3. A transformer comprising a core having top, bottom, side and middle legs, a primary winding distributed about the top, bottom and side legs, and a secondary winding distributed about the top and bottom legs.

4. A transformer comprising a core having top, bottom, side and middle legs, a primary winding distributed about the top, side and bottom legs, and a secondary winding distributed about the middle and two of said other legs.

5. A transformer comprising a core having top, bottom, side and middle legs, a primary winding distributed about the top, bottom and side legs, and a secondary winding distributed about the top, bottom and middle legs.

6. A transformer comprising a core having top, bottom, side and middle legs, and primary and secondary windings of which the former embodies sections mounted on the core at opposite sides of the middle leg and having two adjacent ends thereof connected in series, a lead extending from the connected ends of said sections, and leads extending from the other and unconnected ends of said sections.

7. A transformer comprising a core having top, bottom, side and middle legs, a primary winding, a secondary coil on one of said legs, and secondary coils on other of said legs and connected in parallel and connected in series with said first secondary coil.

In testimony whereof I affix my signature.

FREDERICK C. OWEN.